(12) United States Patent
Hata

(10) Patent No.: US 7,702,210 B2
(45) Date of Patent: Apr. 20, 2010

(54) VIDEO SIGNAL REPRODUCING APPARATUS

(75) Inventor: Makoto Hata, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 1348 days.

(21) Appl. No.: 11/126,386

(22) Filed: May 11, 2005

(65) Prior Publication Data

US 2005/0254784 A1    Nov. 17, 2005

(30) Foreign Application Priority Data

May 12, 2004    (JP)    ............................ P2004-142588

(51) Int. Cl.
*H04N 5/76*    (2006.01)
*H04N 5/00*    (2006.01)

(52) U.S. Cl. ........................................ 386/68; 386/125

(58) Field of Classification Search ........................ None
See application file for complete search history.

(56) References Cited

U.S. PATENT DOCUMENTS 5,495,528 A * 2/1996 Dunn et al. ............... 379/93.17

2007/0097799 A1 * 5/2007 Ohizumi et al. .......... 369/30.04

FOREIGN PATENT DOCUMENTS

| JP | 11-041563 A | 2/1999 |
| JP | 11-238367 A | 8/1999 |
| JP | 2005025913 A * | 1/2005 |

* cited by examiner

*Primary Examiner*—Thai Tran
*Assistant Examiner*—Nigar Chowdhury
(74) *Attorney, Agent, or Firm*—Morgan, Lewis & Bockius LLP (57) ABSTRACT

A video signal reproducing apparatus for playing a recording medium on which a video signal is recorded and inhibited operation information is recorded which is information representing whether or not an inputted key operation is inhibited, includes a control means of displaying, if the inputted key operation is inhibited on the inhibited operation information, an alternative operation message causing a user to select whether or not an alternative key operation is used, the alternative key operation giving an alternative processing coupled with a processing required by the inputted key operation, and of making, if the user selects using the alternative key operation, on an assumption that the alternative key operation not inhibited on the inhibited operation information and giving alternative processing has been inputted by the user, control of executing a processing corresponding to the alternative key operation.

7 Claims, 7 Drawing Sheets

FIG. 11

VIDEO SIGNAL REPRODUCING APPARATUS

BACKGROUND OF THE INVENTION

1. Field of the Invention

This invention relates to a video signal reproducing apparatus for reproducing or playing a recording medium on which a video signal is recorded and inhibition operation information is recorded which is information representing whether or not an inputted key operation should be inhibited.

2. Description of the Related Art

In the DVD with various video signals recorded thereon, where there is a key operation whose use is not desired when viewed from the side of a producer while a certain scene is being played, the key operation can be inhibited. Therefore the key operation to be inhibited differs in the DVDs. Further, even with the same DVD, as the case may be, the key operation inhibited is different according to different scenes being played. Thus, it is often unknown for a user whether or not the key operation to be inputted is inhibited. In order to obviate such an inconvenience, the following technique has been proposed (referred to as the first related art). Specifically, in this technique, where a sub-image indicative of operation inhibition has been recorded, if the inhibited key operation is inputted, the sub-image is displayed to tell that the inputted key operation is inhibited. Where the sub-image has not been recorded, a warning sentence indicative of operation inhibition is displayed using "on-screen display" (for example, see JP-A-11-41563, Paragraphs 0763-0764).

The following technique has been also proposed (referred to as the second related art). In this technique, each of key switches on a remote controller is equipped with a lighting means. And where the DVD is being played, the key switch whose operation is not inhibited is lit whereas the key switch whose operation is inhibited is extinguished. Thus, the key switch(s) whose operation is inhibited is prevented from being unnecessarily operated. By on-screen displaying the icons of the remote controller with only conspicuous key switches whose operation is permitted, the key switch(s) whose operation is inhibited is prevented from being unnecessarily operated (for example, JP-A-11-238367, Paragraphs 0540, 0543-0545).

However the above related arts presented the following problems. When a user operates a skip key because he or she hopes playing jumped to the subsequent chapter on the way of playing, if this key operation has been inhibited, in the first related art, it is only shown that the operation is inhibited by the sub-image recorded on the DVD, or the warning sentence. Thus, the user was forced to tolerate the inconvenience of stopping the playing jumped to the subsequent chapter.

On the other hand, in the second related art, it is known that the operation of the skip key has been inhibited prior to doing the key operation. So the skip key is prevented from being unnecessarily operated. However, in this case also, the user is forced to tolerate the inconvenience of stopping the playing jumped to the subsequent chapter.

This invention has been accomplished in order to solve the above problems. An object of this invention is to provide a video signal reproducing apparatus in which if an inputted key operation is inhibited, an alternative operation message is displayed which causes a user to select whether or not an alternative key operation is used, the alternative key operation giving alternative processing coupled with the processing required by the inputted key operation, and if the user selects using the alternative key operation, the key operation corresponding to the alternative key operation is executed, so that even if the key operation inputted by the user is inhibited, the processing hoped by the user can be executed by a simple operation, displaying of the alternative operation message is prevented from becoming troublesome, the quantity of software to be added to execute the alternative key operation is prevented from being increased, displaying of the alternative operation message is prevented from hindering user's enjoying playing a title, and a strong impression that the key operation inputted is inhibited is given to the user.

Another object of this invention is to provide a video signal reproducing apparatus in which if an inputted key operation is inhibited, an alternative operation message is displayed which causes a user to select whether or not an alternative key operation is used, the alternative key operation giving alternative processing coupled with the processing required by the inputted key operation, and if the user selects using the alternative key operation, the key operation corresponding to the alternative key operation is executed, so that even if the key operation inputted by the user is inhibited, the processing hoped by the user can be executed by a simple operation.

Still another object of this invention is to provide a video signal reproducing apparatus which can prevent displaying of the alternative operation message from becoming troublesome by displaying an alternative operation message when the key operation which is inhibited is inputted repeatedly to exceed a prescribed number of times.

Yet another object of this invention is to provide a video signal reproducing apparatus which can prevent the quantity of software to be added to execute the alternative key operation from being increased by storing, in the key inputting buffer if the user selects using the alternative key operation, the data corresponding to the alternative key operation and thereafter executing the processing corresponding to the data stored in the key inputting buffer.

A further object of this invention is to provide a video signal reproducing apparatus which can prevent displaying of the alternative operation message from hindering user's enjoying playing a title by temporarily stopping, if the temporary stopping of movement of a screen is permitted, the movement of the screen.

A further object of this invention is to provide a video signal reproducing apparatus which can inform a key operating method for executing the processing hoped by a user even if the user's inputted key operation is inhibited by displaying if the inputted key operation is inhibited, an alternative key operating method giving alternative processing coupled with the processing required by the inputted operation.

A further object of this invention is to provide a video signal reproducing apparatus which can prevent displaying of the alternative key operating method from becoming troublesome by displaying an alternative key operating method when the key operation which is inhibited is inputted repeatedly to exceed a prescribed number of times.

A further object of this invention is to provide a video signal reproducing apparatus which can prevent displaying of the alternative key operating method from hindering user's enjoying playing a title by temporarily stopping by stopping, if the temporary stopping of movement of a screen is permitted, the movement of the screen.

SUMMARY OF THE INVENTION

In order to solve the above problems, the video signal reproducing apparatus according to this invention is applied to a video signal reproducing apparatus for playing a DVD on which a video signal is recorded and inhibited operation information is recorded which is information representing whether or not an inputted key operation should be inhibited including a control means of displaying if the inputted key operation is inhibited on the inhibited operation information an alternative operation message causing a user to select whether or not an alternative key operation is used the alternative key operation giving the alternative processing coupled with the processing required by the inputted key operation, and of making if the user selects using the alternative key operation on the assumption that the alternative key operation not inhibited on the inhibited operation information and giving alternative processing has been inputted by the user control of executing the processing corresponding to the alternative key operation. And the control means displays an alternative operation message when any single key operation of the key operations which are inhibited on the inhibited operation information is repeatedly inputted to exceed a prescribed number of times without intervening any other key operation, stores in a key inputting buffer if the key operation is inputted the data corresponding to an inputted key operation and thereafter makes the control of executing the processing corresponding to the data stored in the key inputting buffer, stores in the key inputting buffer if the user selects using the alternative key operation the data corresponding to the alternative key operation and thereafter makes the control of the processing corresponding to the data stored in the key inputting buffer, temporarily stops, if the temporary stopping of movement of a screen is permitted when the alternative operation message is displayed, the movement of the screen, and displays if there is no alternative key operation and when any single key operation of the key operations which are inhibited on the inhibited operation information is repeatedly inputted to exceed a prescribed number of times without intervening any other key operation a message indicative of that the inputted key operation is inhibited in characters.

Namely, the control means makes control of executing the processing corresponding to the alternative key operation on the assumption that the alternative key operation has been inputted by the user if the user selects using the alternative key operation. Therefore when viewed from the user's side, the operation indicative of selection of using the alternative key operation is only done to execute the processing coupled with the required processing. Further, since the number of times of inputting the inhibited key operation without knowing that it is inhibited does not exceed the prescribed number of times, where the inhibited key operation is inputted without knowing that it is inhibited, the alternative operation message is not displayed. Further, the processing of the control means after the data corresponding to the alternative key operation have been stored in the key inputting buffer is identical to the processing after the data corresponding to a normal key operation have been stored in the key inputting buffer. Further, when display of the alternative operation message has been completed, a continuation of the image immediately before the display of the alternative operation message is started can be displayed on the screen. Further, when the inhibited key operation is repeatedly inputted, the fact that that it is inhibited is displayed in a more attention-attractive form.

The video signal reproducing apparatus according to this invention is applied to a video signal reproducing apparatus for playing a recording medium on which a video signal is recorded and inhibited operation information is recorded which is information representing whether or not an inputted key operation should be inhibited, including a control means of displaying, if the inputted key operation is inhibited on the inhibited operation information, an alternative operation message causing a user to select whether or not an alternative key operation is used, the alternative key operation giving the alternative processing coupled with the processing required by the inputted key operation, and of making, if the user selects using the alternative key operation, on the assumption that the alternative key operation inhibited on the inhibited operation information and giving alternative processing has been inputted by the user, control of executing the processing corresponding to the alternative key operation.

Namely, the control means makes control of executing the processing corresponding to the alternative key operation on the assumption that the alternative key operation has been inputted by the user if the user selects using the alternative key operation. Therefore when viewed from the user's side, the operation indicative of selection of using the alternative key operation is only done to execute the processing coupled with the required processing.

In addition to the above configuration, the control means displays an alternative operation message when any single key operation of the key operations which are inhibited on the inhibited operation information is repeatedly inputted to exceed a prescribed number of times without intervening any other key operation. Namely, since the number of times of inputting the inhibited key operation without knowing that it is inhibited does not exceed the prescribed number of times, where the inhibited key operation is inputted without knowing that it is inhibited, the alternative operation message is not displayed.

In addition to the above configuration, the controls means stores, in a key inputting buffer if the key operation is inputted, the data corresponding to an inputted key operation, and thereafter executes control of executing the processing corresponding to the data stored in the key inputting buffer, and stores, in the key inputting buffer if the user selects using the alternative key operation, the data corresponding to the alternative key operation and thereafter makes control of executing the processing corresponding to the data stored in the key inputting buffer. Namely, the processing of the control means after the data corresponding to the alternative key operation have been stored in the key inputting buffer is identical to the processing after the data corresponding to a normal key operation have been stored in the key inputting buffer.

In addition to the above configuration, the control means temporarily stops, if the temporary stopping of movement of a screen is permitted when the alternative operation message is displayed, the movement of the screen. Namely, when display of the alternative operation message has been completed, a continuation of the image immediately before the display of the alternative operation message is started can be displayed on the screen.

The video signal reproducing apparatus according to this invention is applied to a video signal reproducing apparatus for playing a recording medium on which a video signal is recorded and inhibited operation information is recorded which is information representing whether or not an inputted key operation should be inhibited, including a control means for displaying, if the inputted key operation is inhibited on the inhibited operation information, an alternative key operating method which is a key operating method giving alternative processing which is processing coupled with the processing required by the inputted operation.

Namely, if the inputted key operation is inhibited, the key operating method for executing the processing coupled with the required processing is displayed.

In addition to the above configuration, the control means displays an alternative key operating method when any single key operation of the key operations which are inhibited on the inhibited operation information is repeatedly inputted to exceed a prescribed number of times without intervening any other key operation. Namely, since the number of times of inputting the inhibited key operation without knowing that it is inhibited does not exceed the prescribed number of times, where the inhibited key operation is inputted without knowing that it is inhibited, the alternative key operating method is not displayed.

In addition to the above configuration, the control means temporarily stops, if the temporary stopping of movement of a screen is permitted when the alternative key operating method is displayed, the movement of the screen. Namely, when display of the alternative key operating method has been completed, a continuation of the image immediately before the display of the alternative key operating method is started can be displayed on the screen.

In accordance with this invention, the control means makes control of executing the processing corresponding to the alternative key operation on the assumption that the alternative key operation has been inputted by the user if the user selects using the alternative key operation. Therefore when viewed from the user's side, the operation indicative of selection of using the alternative key operation is done to execute the processing coupled with the required processing. Further, where the inhibited key operation is inputted without knowing that it is inhibited, the alternative operation message is not displayed. Further, the processing of the control means after the data corresponding to the alternative key operation have been stored in the key inputting buffer is identical to the processing after the data corresponding to a normal key operation have been stored in the key inputting buffer. Further, when display of the alternative operation message has been completed, a continuation of the image immediately before the display of the alternative operation message is started can be displayed on the screen. Further, when the inhibited key operation is repeatedly inputted, the fact that that it is inhibited is displayed in a more attention-attractive form. For this reason, even if the key operation inputted by the user is inhibited, the processing hoped by the user can be executed by a simple operation, displaying of the alternative operation message is prevented from becoming troublesome, the quantity of software to be added to execute the alternative key operation is prevented from being increased, displaying of the alternative operation message is prevented from hindering user's enjoying playing a title, and a strong impression of the fact that the key operation inputted is inhibited is given to the user.

In accordance with this invention, the operation indicative of selecting the alternative key operation is done to execute the processing coupled with the required processing. For this reason, even if the key operation inputted by the user is inhibited, the processing hoped by the user can be executed by a simple operation.

Further, where the inhibited key operation is inputted without knowing that it is inhibited, the alternative operation message is not displayed. For this reason, displaying of the alternative operation message is prevented from becoming troublesome.

Further, the processing of the control means after the data corresponding to the alternative key operation have been stored in the key inputting buffer is identical to the processing after the data-corresponding to a normal key operation have been stored in the key inputting buffer. For this reason, the quantity of software to be added to execute the alternative key operation is prevented from being increased.

Further, when display of the alternative operation message has been completed, a continuation of the image immediately before the display of the alternative operation message is started can be displayed on the screen. For this reason, displaying of the alternative operation message is prevented from hindering user's enjoying playing a title.

Further, in accordance with this invention, if the inputted key operation is inhibited, the key operating method for executing the processing coupled with the processing required by the user is displayed. For this reason, the key operating method for executing the processing hoped by a user can be informed even if the user's inputted key operation is inhibited.

Further, where the inhibited key operation is inputted without knowing that it is inhibited, the alternative key operating method is not displayed. For this reason, displaying of the alternative key operating method is prevented from becoming troublesome.

Further, when display of the alternative key operating method has been completed, a continuation of the image immediately before the display of the alternative key operating method is started can be displayed on the screen. For this reason, displaying of the alternative key operating method is prevented from hindering user's enjoying playing a title.

DETAILED DESCRIPTION OF THE INVENTION

Now referring to the drawings, an explanation will be given of various embodiments of this invention.

Embodiment 1

Figure 2:
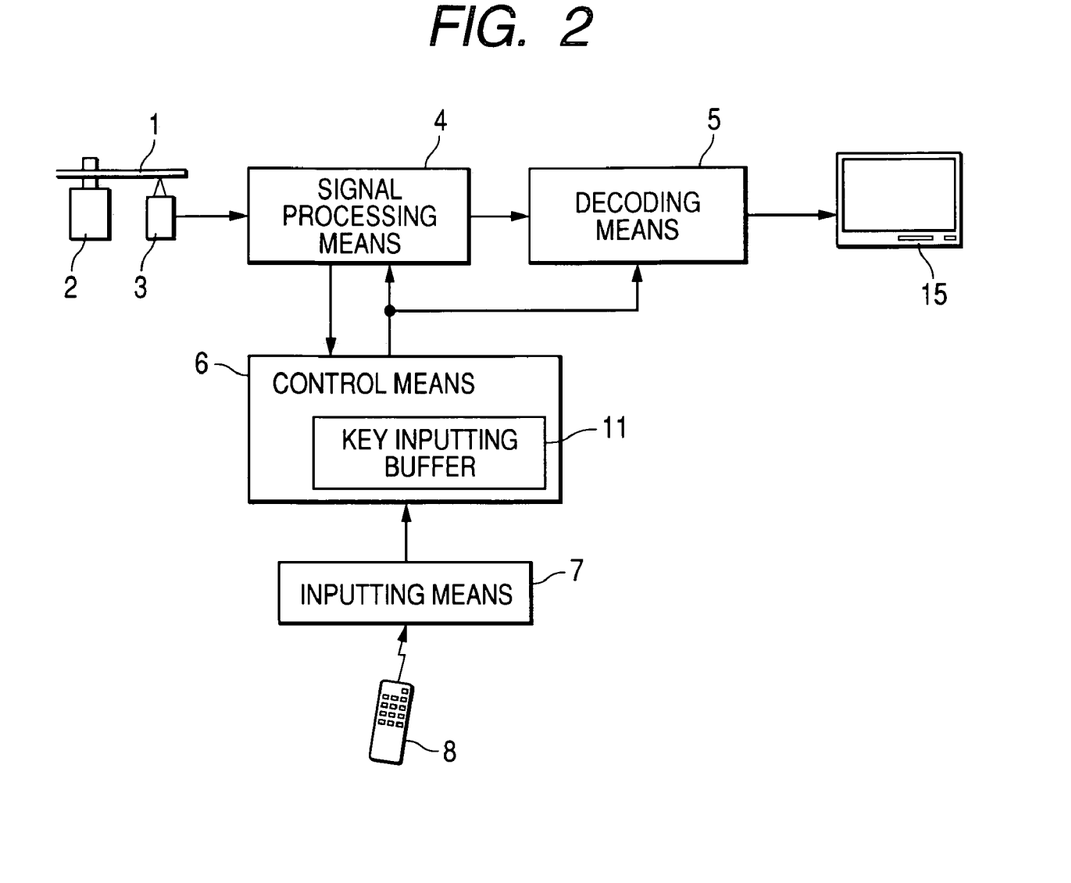
FIG. 2 is a block diagram showing an electric configuration of embodiments of this invention.

FIG. 2 is a block diagram showing the electric configuration according to the first embodiment of a video signal reproducing apparatus according to this invention.

In FIG. 2, a DVD 1 is a recording medium described in Claims and contains a recorded video signal. Recorded is information (inhibited operation information described in Claims and indicative of whether or not the operation by a user is permitted) relative to the key operation which is inhibited while the image or information recorded on the DVD 1 is being displayed in the form of a group of user operation bits.

A pickup 3 reads the data from the DVD 1 which is rotation-driven to give a CLV (constant linear velocity) by a spindle motor 2. The signal representative of the data read is supplied to a signal processing means 4. The signal processing means 4 takes out digital data from the signal outputted from the pickup 3 and decodes the data. The decoded data, after having been error-corrected, are supplied to a decoding means 5. Inhibited operation information separated from the error-corrected data is supplied to a control means 6.

The decoding means 5 extends, in a MPEG2 format, the stream indicative of a video signal of the data streams outputted from the signal processing means 4, and thereafter converts the stream extended into an analog video signal to be supplied to a television receiver 15. The decoding means 5 also extends, using an audio signal decoder not shown, the stream indicative of an audio signal of the data streams outputted from the signal processing means 4, and thereafter converts the stream extended into an analog audio signal to be supplied to the television receiver 15. Further, by using an "on-screen display circuit" (not shown), the signal representative of the character or symbol and a sub-image is created and the signal thus created is superposed on the video signal.

An inputting means 7 is provided with a plurality of key switches (not shown) provided on the front panel of an apparatus body and a light receiving unit (not shown) for receiving an infrared ray signal transmitted from a remote controller. When the key operation is inputted by a user, the signal corresponding to the key operation inputted is transmitted to a control means 6.

The control means 6 is constructed to have a main part of a microcomputer, and controls the main processing of a DVD playing apparatus. Specifically, if the key operation of the user inputted by the remote controller 8 designates e.g. reproduction or playing, the control means 6 controls the processing of the signal processing means 4 and decoding means 5 so that the video signal acquired by playing the DVD 1 is displayed on the television receiver 15. Further, when the skip key (not shown) of the remote controller 8 is operated while the DVD 1 is being played, if the operation of the skip key is not inhibited, the position of playing is moved to the starting position of a next chapter (control is made to do playing from the start of the next chapter).

Further, whenever a group of user operation bits are outputted from the signal processing means 4, the control means 6 takes out the inhibited operation information which represents what key operation is inhibited and internally stores the information. And when the user inputs the key operation onto the remote controller 8, if this key operation is inhibited on the inhibited operation information, the control means 6 checks if or not there is an alternative key operation.

Now, the alternative key operation will be explained. The alternative key operation is composed of the key operations which are not inhibited in the inhibited operation information. The alternative key operation is a key operation (which is often a combination of two or more key operations) which gives the operation coupled with the processing required by the key operation inputted by the user. The alternative key operation will be described later in detail.

Returning to the explanation of the construction of the control means 6, if it is known that there is the alternative key operation, the control means 6 displays an alternative operation message, which is a message for causing the user to select whether or not the alternative key operation is used, on the television receiver 15. And if the user selects to use the alternative key operation, the control means 6 equalizes the status of a key inputting buffer 11 to the status when the alternative key operation is actually inputted on the remote controller 8. Namely, although the alternative key operation is not inputted on the remote controller 8, on the assumption that the alternative key operation has been inputted on the remote controller 8, the control means 6 stores the data corresponding to the alternative key operation in the key inputting buffer 11. Thereafter, the control means 6 makes the control of executing the processing corresponding to the data stored in the key inputting buffer 11.

Incidentally, the alternative operation message is displayed when any single key operation of the key operations which are inhibited on the inhibited operation information is repeatedly inputted to exceed (e.g. three times) a prescribed number of times without intervening any other key operation (this condition is hereinafter referred to as a message displaying condition). On the other hand, if the message displaying condition is not satisfied, where the key operation which is inhibited on the inhibited operation information is inputted, the control means 6 makes the control not displaying the alternative operation message, but displaying an inhibition mark (see FIG. 3) which represents that the pertinent key operation is inhibited.

Further, where the alternative operation message is displayed, if the movement of a screen can be temporarily stopped, the movement of the screen is temporarily stopped. Further, where the key operation which is inhibited on the inhibited operation information has been inputted and also any alternative key operation is not found, if the message displaying condition is satisfied, in place of the inhibition mark, the message representing that the inputted key operation is inhibited is displayed in characters.

Additionally, where the key operation is inputted on the remote controller 8, if the key operation inputted is not inhibited, the control means 6 stores the data corresponding to the key operation in the key inputting buffer 11. Thereafter, the control means 6 makes the control for executing the processing corresponding to the data stored in the key inputting buffer 11.

Figure 1:
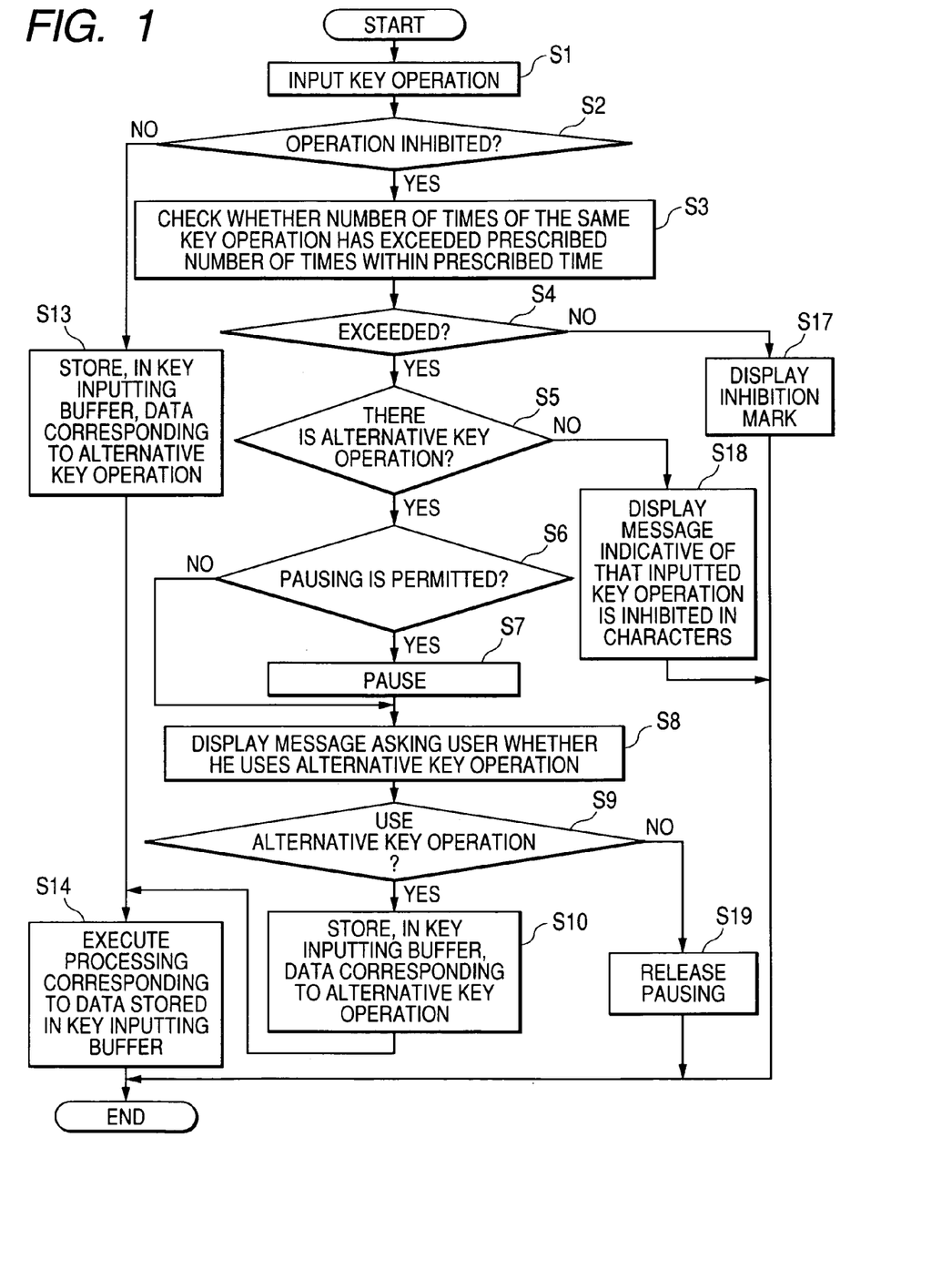
FIG. 1 is a flowchart showing the main processing in a DVD playing apparatus which is a first embodiment of the video signal reproducing apparatus according to this invention.

FIG. 1 is a flowchart showing the main processing of the embodiment described above. Referring to FIG. 1 as required, an explanation will be given of this embodiment.

Now it is assumed that the DVD 1 is in a status where it is being played. In this status, it is assumed that a user has operated a skip key (not shown) of the remote controller 8 (step S1). If the operation of the skip key is not inhibited on the inhibited key information, the control means 6 stores the data indicative of the operation of the skip key in the key inputting buffer 11 (steps S2, S13), and thereafter makes the control for executing the processing corresponding to the data stored in the key inputting buffer 11. Thus, playing is started from the start of the chapter subsequent to the chapter now being played (step S14).

On the other hand, if the operation of the skip key is inhibited on the inhibited operation information, the control means 6 checks whether or not the operation of the skip key has been repeatedly inputted three or more times within ten seconds, i.e. whether or not the message display condition is satisfied (step S3). If the operation of the skip key does not satisfy the above message displaying condition (for example, the operation of the skip key has been inputted twice within ten seconds), the control means 6 controls the decoding means 5 so that the inhibition mark (see FIG. 3) is superposition-displayed on the reproduced image.

On the other hand, if the message displaying condition is satisfied, the control means 6 checks whether or not there is an alternative key operation. Now, the alternative operation will be explained in detail. The operation of the skip key in the playing status is an operation requiring the playing from the starting position of the subsequent chapter. Therefore if the operation of a stop key is not inhibited on the inhibited key information, where the operation of the stop key and the operation of a title key (which is an operation of displaying a list of chapters) are executed as the alternative key operation, the alternative processing coupled with the processing required by the skip key can be obtained (if the chapter subsequent to the chapter now being played is selectively played from the list of the chapters, the processing equivalent to the case where the operation of the skip key has been accepted can be obtained).

Thus, if the operation of the stop key is not inhibited, the alternative key operation is realized as a combination of the operation of the stop key and the operation of the title key. So the processing proceeds from step S5 to step S6 where it is checked whether or not temporary stopping of playing (reproduction) is permitted. And if the temporary stopping of playing is not inhibited, the control means 6 temporarily stops the playing (step S7), and displays the alternative operation message, which is a message causing the user to select whether or not the alternative key operation is used, on the television receiver 15 (step S8).

Figure 4:
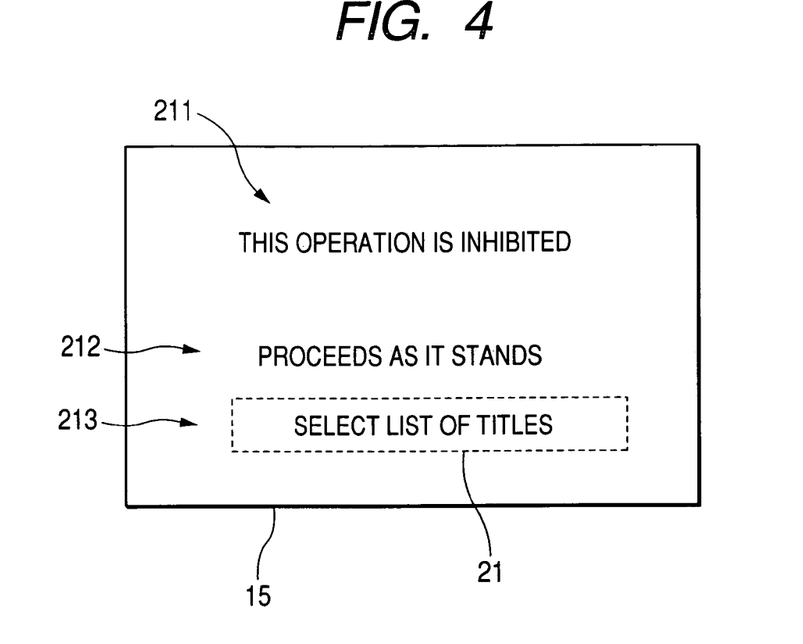
FIG. 4 is a view for explaining alternative operation messages displayed when the key operation of a skip key, which is inhibited, has been made on the way of playing.

FIG. 4 shows the reproduction screen of the television receiver 15 in during above processing. The alternative operation message is "select from a list of chapters" (indicated by 213). Incidentally, in the above processing, the message indicative of that the operation of the skip key is inhibited is displayed in large characters on the screen (indicated by 211). A message 212 that "proceed as it stands" which is an option or choice when using the alternative key operation is not selected is also displayed.

In the status where the above three kinds of messages 211 to 213 are being displayed, with a cursor (indicated by broken line 21) located on the alternative operation message 213, when a decision key is operated, on the assumption that using the alternative key operation has been selected, the control means 6 stores the data corresponding to the alternative key in the key inputting buffer 11. Namely, the control means 6 stores the data corresponding to the data corresponding to the operation of the stop key and the data corresponding to the operation of the title key in the key inputting buffer 11 (step S10). Thereafter, the processing proceeds to the control of the processing corresponding to the data stored in the key inputting buffer 11 (step S14).

Therefore when step S14 has been reached, the control means 6 makes the control for proceeding to the stopping state in accordance with the data indicative of the operation of the stop key stored in the key inputting buffer 11. Thereafter, the control means 6 makes the control for thumbnail-displaying a list of chapters. Thus, the list of the chapters is thumbnail-displayed on the television receiver 15. After moving, on the list of the chapters thumbnail-displayed, the cursor to the chapter subsequent to the chapter having been displayed when the skip key is operated, if the decision key is operated, playing, i.e., the processing corresponding to the operation of the skip key is started from the chapter subsequent to the chapter having been played when the skip key is operated.

Incidentally, where the list of chapters is thumbnail-displayed with the cursor located on the chapter subsequent to the chapter having been played when the skip key is operated, without moving the cursor, the decision key has only to be operated to execute the processing corresponding to the operation of the skip key. This is more convenient.

On the other hand, in step S9, if the cursor 21 is moved onto the message 212 that "proceeds as it stands" and subsequently the decision key is operated, on the assumption that using the alternative key operation has not been selected, the control means 6 makes the control of stopping display of the messages 211 to 213, releasing temporary stopping of playing and resuming playing (also when the messages 211 to 213 are superposition-displayed because the temporary stopping is inhibited, where the playing has been continued, only the control of stopping the display of the messages 211 to 213 is executed) (step S19).

In step S6, if the temporary stopping is inhibited, the processing proceeds immediately from step S6 to step S8. Therefore in the status where playing has been continued, the messages 211 to 213 shown in FIG. 4 are superposition-displayed on the reproduction screen.

Where not only the operation of the skip key but also the operation of the stop key are inhibited because the reproduced contents represent the warning such as "watch in a light room", it is difficult to constitute the alternative key operation. Thus, in this case, it is determined that there is not the alternative key operation and so the processing proceeds from step S5 to step S18. In this case, only the message indicative of that the inputted key operation is inhibited are displayed in characters on the television receiver 15. Namely, of the messages shown in FIG. 4, only the message 211 that "this operation is inhibited" is displayed.

The explanation on the processing when the skip key has been operated during playing has been made hitherto. Next, an explanation will be given of the processing when the key operation designating the playing of the subsequent title has been inputted.

Figure 3:
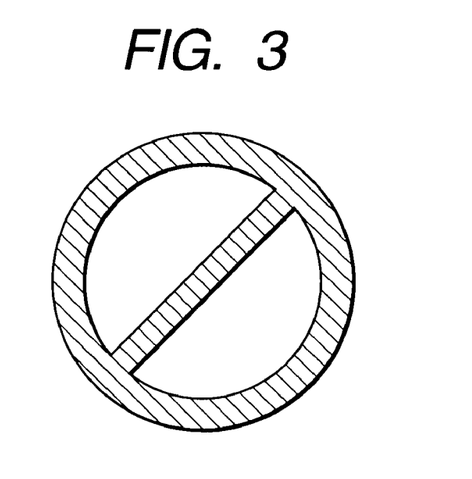
FIG. 3 is a view showing an inhibition mark.

If the key operation designating the playing of the subsequent title (key operation of title search) is not inhibited, the control of playing the title subsequent to the title now being played is made (steps S1, S2, S13 and S14). On the other hand, if the key operation of title search is inhibited, where the message display condition is not satisfied, an inhibition mark as shown in FIG. 3 is displayed (step S1 to S4, S17). Further, if the alternative key operation is not found because there are a very large number of inhibited operations on the inhibited operation information, when the message displaying condition has been satisfied, only the message indicative of that the inputted key operation is inhibited (for example, indicated by 221 in FIG. 5) is displayed in characters on the screen of the television receiver 15 (steps S1 to S5, S18).

Figure 5:
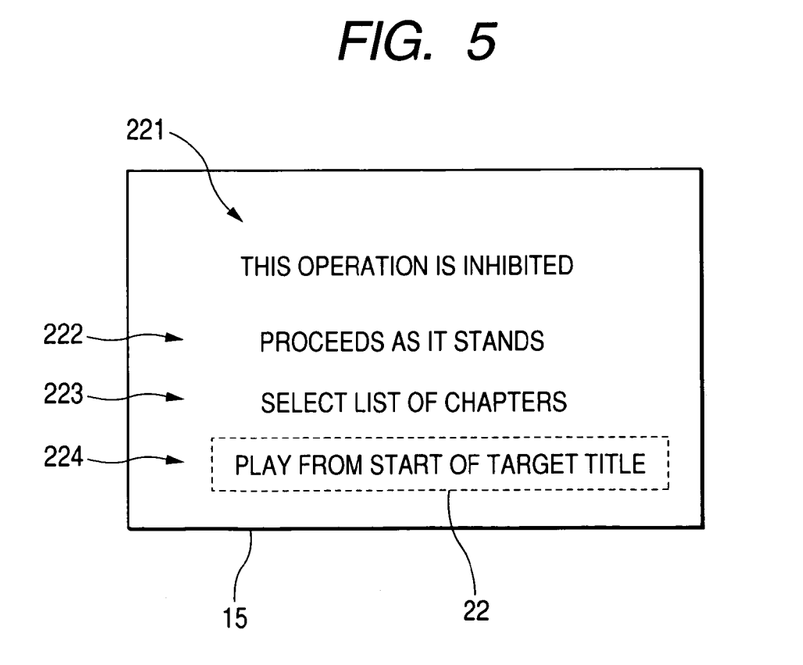
FIG. 5 is a view for explaining alternative operation messages displayed when the key operation of title search, which is inhibited, has been made on the way of playing.

On the other hand, if there is the alternative key operation, the messages as shown in FIG. 5 are displayed. Namely, displayed is the message 221 indicative of that the inputted key operation is inhibited and the message 222 indicative of that using the alternative operation is not selected. Also displayed is an alternative operation message 223 indicative of a first alternative key operation and another alternative operation message 224 indicative of a second alternative key operation.

Of these two alternative operation messages, the alternative key operation indicated by the alternative operation message 223 of "select from a list of chapters" is a key operation of displaying a list of titles by doing the key operation for displaying the list of chapters after having stopped playing by operating the stop key. Thus, where "select from a list of chapters" is selected, the title subsequent to the title now being played is selected from the list of titles displayed is selected by the cursor and thereafter the decision key has only to be operated to equivalently execute the operation required by the key operation of the title search.

If the user selects "to select from a list of titles", in step S10, stored in the key inputting buffer 11 are the data corresponding to the key operation of the stop key and the data corresponding to the key operation (e.g. operation of a menu key) for displaying the list of titles.

Figure 6:
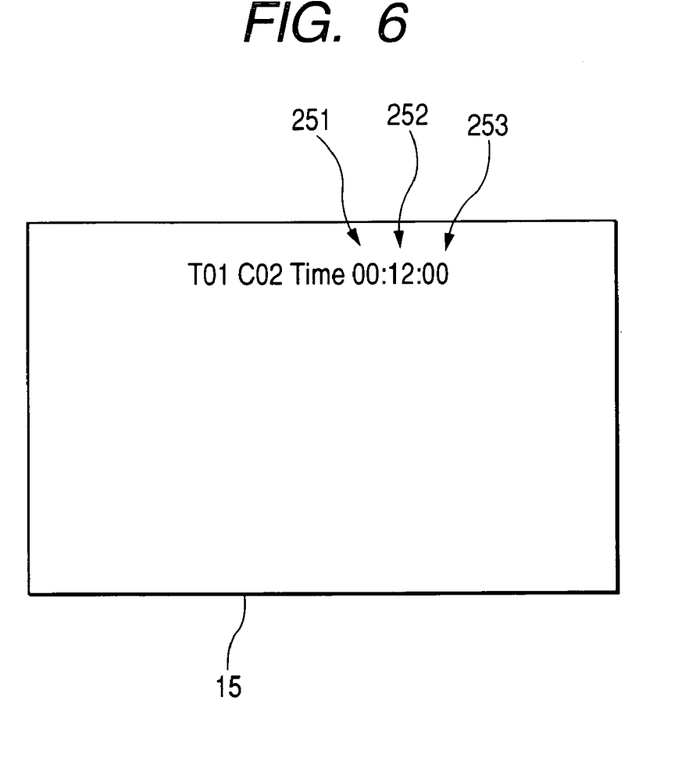
FIG. 6 is a view for explaining screen display when time search is done.

On the other hand, the alternative key operation indicated by the alternative operation message 224 of "play from the start of a target title" is constructed of a key operation of time search (key operation of displaying the timing information indicative of a playing position as shown in FIG. 6), another key operation of inputting timing T11 indicative of the starting position of the title (title 2) subsequent to the title (title 1 in FIG. 7) now being played and still another key operation of instructing the execution of the time search (the timing information of the starting position of the title 2 can be obtained from the DVD 1).

Therefore if the user selects "play from the start of a target title", in step S10, successively stored in the key inputting buffer 11 are the data indicative of the key operation for displaying the timing information, data indicative of the key operation of inputting the timing T11 of the starting position of the title 2 (data indicative of the key operation for locating the cursor on hour input 251, data indicative of the key operation for hour inputting, data indicative of the key operation for locating the cursor on minute input 252, data indicative of the key operation for minute inputting, and data indicative of the key operation for locating the cursor on second input 253, data indicative of the key operation for second inputting) and data indicative of the key operation for starting playing from the position designated by the timing information. Thereafter, the processing of step S14 is executed. Thus, if the user selects "play from the start of a target title", playing is started from the start of the title 2.

Figure 8:
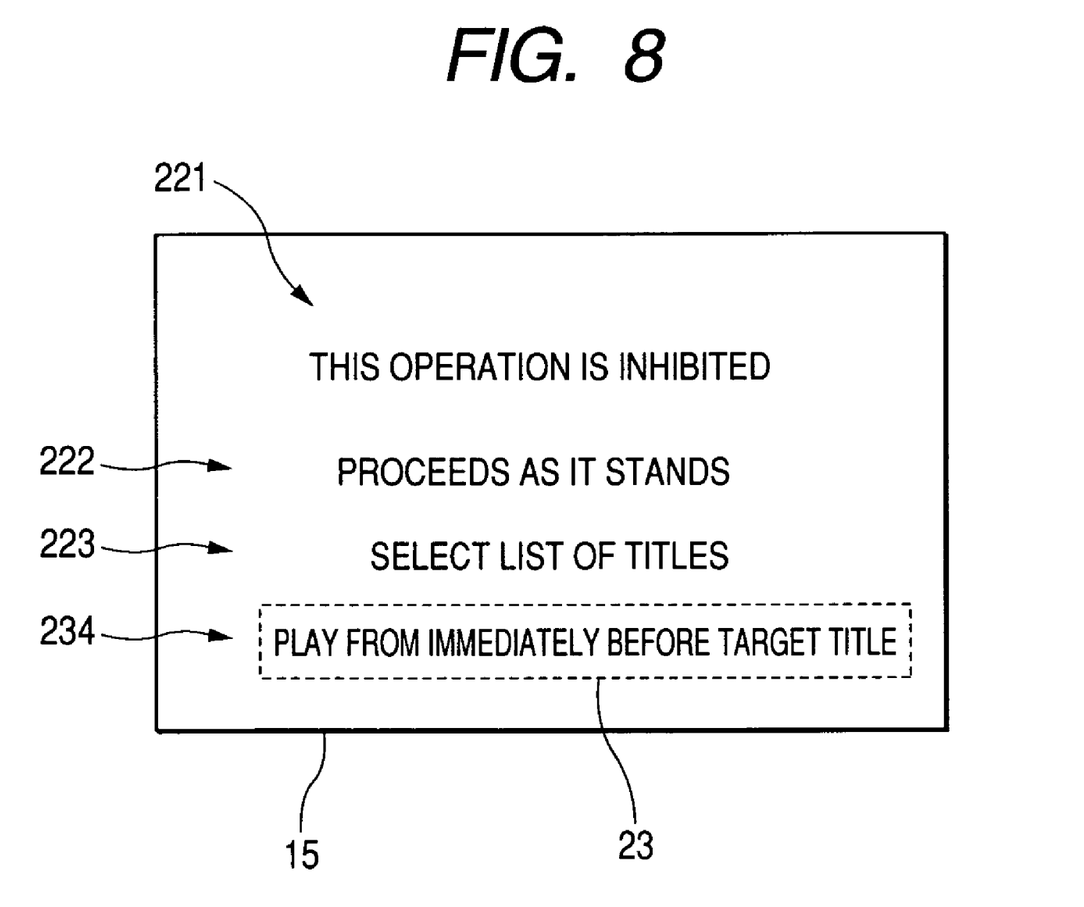
FIG. 8 is a view for explaining alternative operation messages displayed when the key operation of title search, which is inhibited, has been made on the way of playing.

The above processing is processing in the case where the playing through the time search is permitted in the title 2. However, there is a case where although the time search is permitted in the title 1, it is inhibited in the title 2. The processing in such a case will be explained below.

Where the time search is inhibited in the title 2, in step S8, the alternative operation message displayed in step S8 is as shown in FIG. 8. Specifically, displayed are a massage 221 indicative of that the inputted key operation is inhibited, another message 222 selected when using the alternative key operation is not selected and still another message 223 indicative of a first alternative key operation (these messages 221 to 223 are identical to those shown in FIG. 5). An alternative operation message 234 indicative of a third alternative key operation is also displayed.

The third alternative key operation indicated by the alternative operation message 224 of "play from immediately before a target title" is constructed of a key operation of time search (key operation of displaying the timing information indicative of a playing position as shown in FIG. 6), another key operation of inputting a timing (indicated by timing T12 in FIG. 7) slightly before the final position of the title (title 1) now being played and still another key operation of instructing the execution of the time search (the timing information of the final position of the title 2 can be obtained from the DVD 1).

Figure 7:
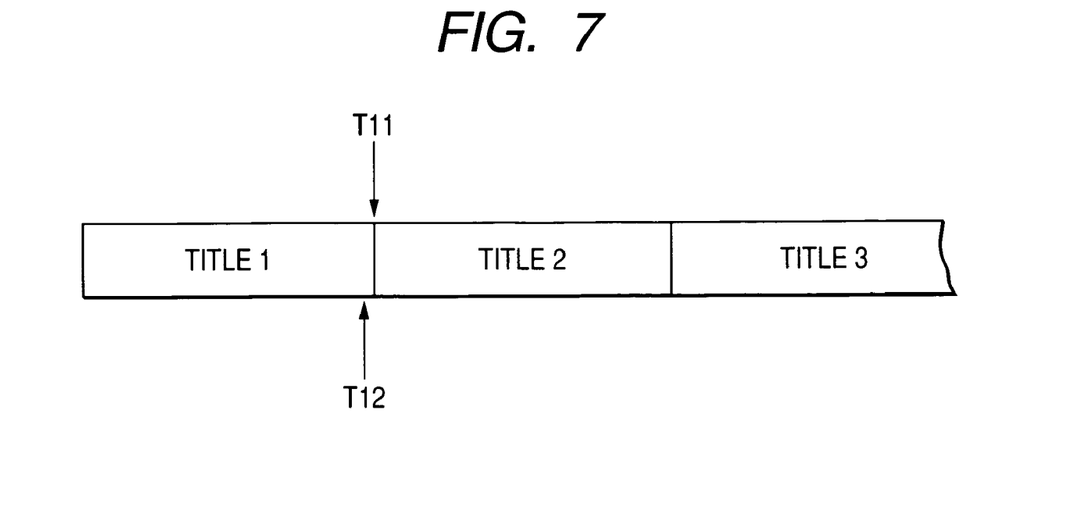
FIG. 7 is a view for explaining the timing positions time-searched.

Therefore if the user selects "play from immediately before a target title", in step S10, successively stored in the key inputting buffer 11 are the data indicative of the key operation for displaying the timing information, data indicative of the key operation of inputting the timing information indicated by the timing T12 of the title 1 and the data indicative of the key operation for starting the play from the position designated by the timing information. Thereafter, the processing of step S14 is executed.

Thus, where the timing T12 is set at 30 sec before the ending of the title 1, when about 30 sec elapses after the "play from immediately before a target title" has been selected, the playing of the title 2 whose playing was requested is started. Further, where the timing T12 is set at 10 sec before the ending of the title 1, when about 10 sec elapses after the "play from immediately before a target title" has been selected, the playing of the title 2 whose playing was requested is started.

Embodiment 2

An explanation will be given of a second embodiment of this invention. The electric configuration of the second embodiment is identical to that shown in FIG. 2 in their block diagram, and is different in only the construction of the control means 6 therefrom. So as regards the configuration of the second embodiment, only the control means 6 will be explained.

The control means 6 is constructed to have a main part of a microcomputer, and controls the main processing of a DVD playing apparatus. Specifically, if the key operation of the user inputted by the remote controller 8 designates e.g. reproduction or playing, the control means 6 controls the processing of the signal processing means 4 and decoding means 5 so that the video signal acquired by playing the DVD 1 is displayed on the television receiver 15. Further, when the skip key (not shown) of the remote controller 8 is operated while the DVD 1 is being played, if the operation of the skip key is not an inhibited operation, the position of playing is moved to the starting position of the subsequent chapter (control is made to do playing from the start of the subsequent chapter).

Further, whenever a group of user operation bits are outputted from the signal processing means 4, the control means 6 takes out the inhibited operation information which represents what key operation is inhibited and internally stores the information. And when the user inputs the key operation onto the remote controller 8, if this key operation is inhibited on the inhibited operation information, the control means 6 checks if or not there is an alternative key operation. If it is known that there is the alternative key operation, the control means 6 displays an alternative key operating method, which is a method for inputting the alternative key operation, on the television receiver 15.

Incidentally, the alternative key operating method is displayed when any single key operation of the key operations which are inhibited on the inhibited operation information is repeatedly inputted a number of times (e.g. three times) exceeding a prescribed number of times without intervening any other key operation (this condition is hereinafter referred to as a method displaying condition). On the other hand, if the method displaying condition is not satisfied, where the key operation which is inhibited on the inhibited operation information is inputted, the control means 6 makes the control not displaying the alternative key operating method, but displaying an inhibition mark (see FIG. 3) which represents that the pertinent key operation is inhibited.

Further, where the alternative key operating method is displayed, if the movement of a screen can be temporarily stopped, the movement of the screen is temporarily stopped. Further, where the key operation which is inhibited on the inhibited operation information has been inputted and also any alternative key operation is not found, if the method displaying condition is satisfied, in place of the inhibition mark, the message representing that the inputted key operation is inhibited is displayed in characters.

Figure 9:
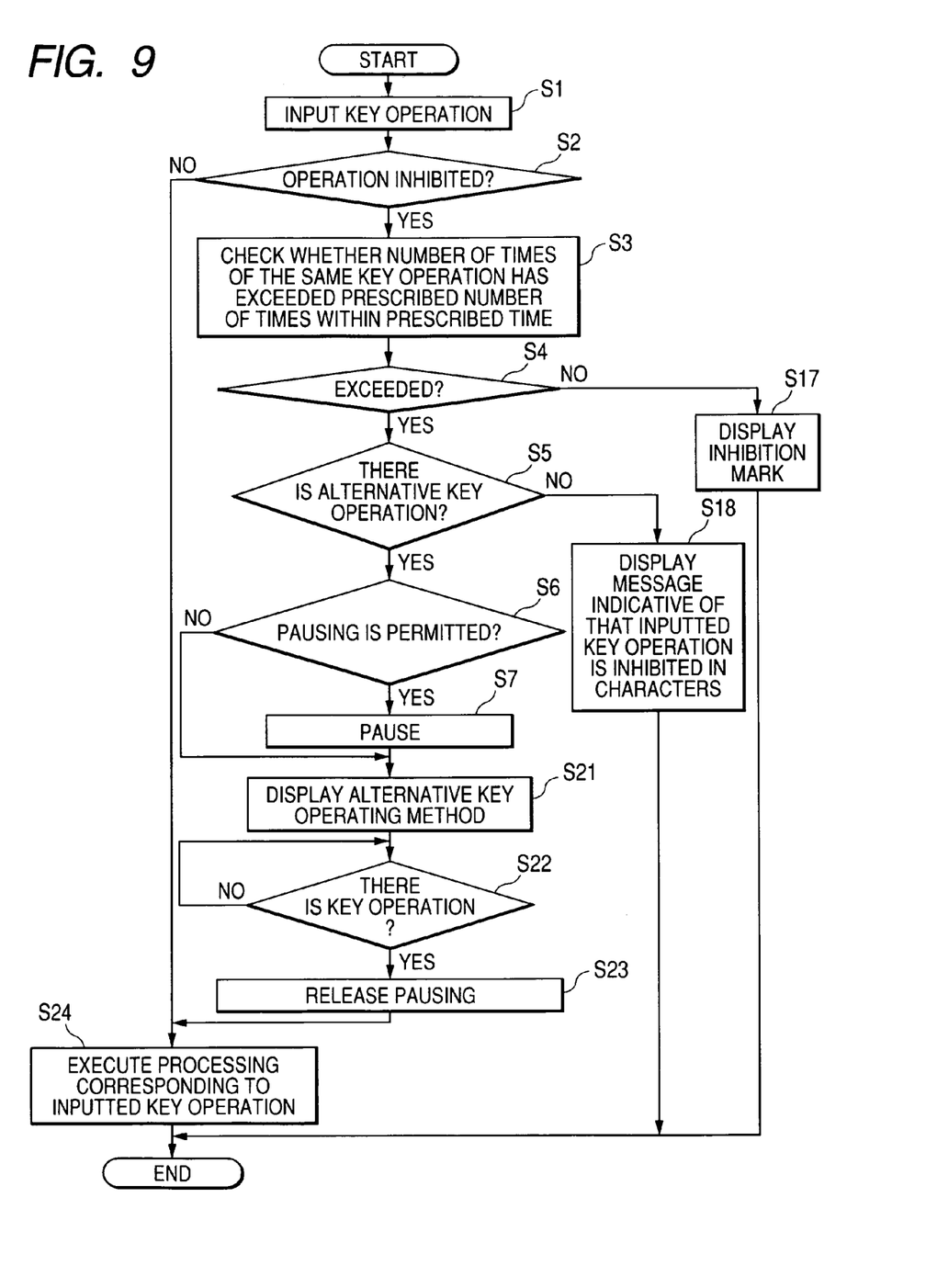
FIG. 9 is a flowchart showing the main processing in the second embodiment of this invention.

FIG. 9 is a flowchart showing the main processing of the second embodiment. In FIG. 9, like reference symbols refer to like processing in the flowchart of FIG. 1.

Now it is assumed that the DVD 1 is in a status where it is being played. In this status, it is assumed that a user has operated a skip key (not shown) of the remote controller 8 (step S1). If the operation of the skip key is not inhibited on the inhibited operation information, the control means 6 stores the data indicative of the operation of the skip key in the key inputting buffer 11, and thereafter makes the control for executing the processing corresponding to the data stored in the key inputting buffer 11. Thus, playing is started from the start of the chapter subsequent to the chapter now being played (step S2, S24).

On the other hand, if the operation of the skip key is inhibited on the inhibited operation information, the control means 6 checks whether or not the operation of the skip key has been repeatedly inputted three or more times within ten seconds, i.e. whether or not the method displaying condition is satisfied (step S3).

If the operation of the skip key does not satisfy the above method displaying condition, the control means 6 checks whether or not there is an alternative key operation. If the operation of the stop key is not inhibited, because there is the alternative key operation, the processing proceeds from step S5 to step S6 where it is checked whether or not temporary stopping of playing (reproduction) is permitted. And if the temporary stopping of playing is not inhibited, the control means 6 temporarily stops the playing (step S7), and displays the alternative key operation method on the television receiver 15 (step S21).

Figure 10:
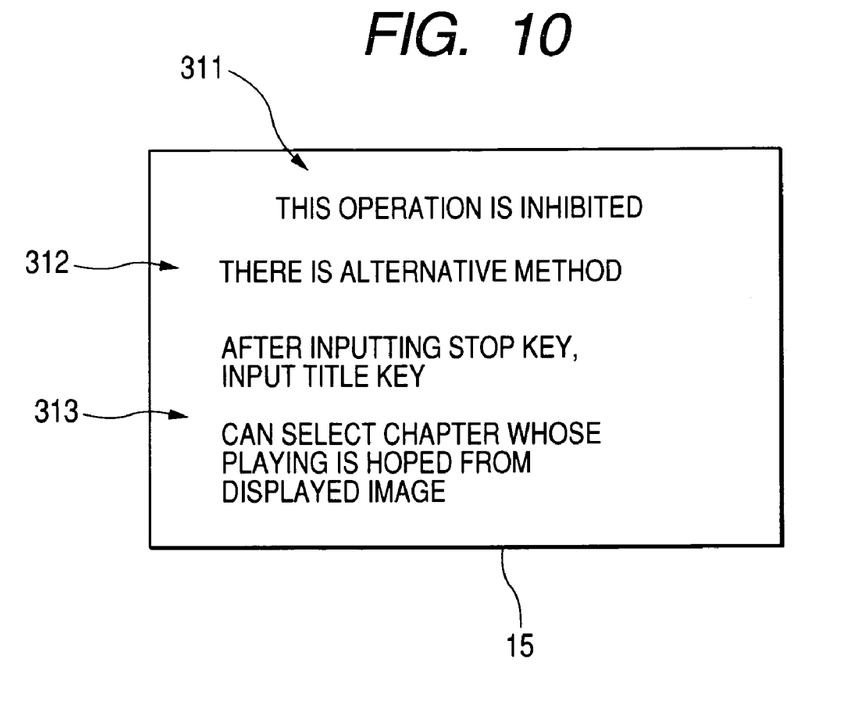
FIG. 10 is a view for explaining alternative operation messages displayed when the key operation of a skip key, which is inhibited, has been made on the way of playing.

FIG. 10 shows the reproduction screen of the television receiver 15 in during above processing. A message indicative of that the operation of the skip key is inhibited is display in large characters on the screen (indicated by 311). Also displayed are another message 312 indicative of that there is the alternative key operating method and a concrete alternative key operating method (indicated by 313).

When the key operation is inputted on the status where the above displaying is now being made, the control means 6 makes the control of the processing corresponding to the inputted key operation after the temporary stopping status has been released (steps S22, S23). So, if the user operates the stop key and thereafter operates the title key according to the alternative key operating method, a list of chapters is displayed on the television receiver 15. Thus, the user can selectively play the chapter whose playing is hoped from the displayed list of chapters (chapter whose playing has been intended by operating the skip).

Figure 11:
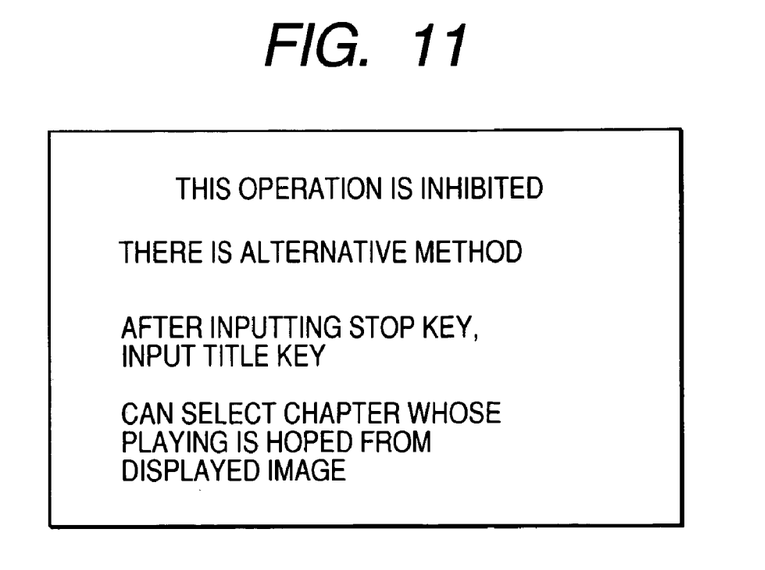
FIG. 11 is a view for explaining alternative operation messages displayed when the key operation of title search, which is inhibited, has been made on the way of playing.

FIG. 11 shows the image (image displayed by step S21) displayed on the television receiver 15 where the key operation of title search is inhibited when the key operation of title search is inputted during playing. If the user operates the stop key and operates the menu key according to the above display, the list of titles is displayed on the television receiver 15. Thus, the user can selectively play the title whose playing is hoped from the displayed list of titles (title whose playing has been intended by operating the title search).

Additionally, the alternative key operation can be previously stored in the form of a data base with retrieve items of the kinds of the operation of the apparatus body when the key operation is inputted and kinds of the inputted key operation. And if the alternative key operation corresponding to the applicable retrieve item is stored in this database, it is found that there is the alternative key operation. In addition, if the alternative key operation retrieved is used for control, the configuration of software for defining the operating method of the alternative key operation can be simplified.

Incidentally, this invention should not be limited to the embodiments described above. Although the explanation has been given of the case using the DVD as the recording medium, this invention is also applicable to the case using the other recording medium, for example, where the recording medium is a hard disk drive.

What is claimed is:

1. A video signal reproducing apparatus for playing a DVD on which a video signal is recorded and inhibited operation information is recorded which is information representing whether or not an inputted key operation is inhibited, the video signal reproducing apparatus comprising:

a control means of displaying, if the inputted key operation is inhibited on the inhibited operation information, an alternative operation message causing a user to select whether or not an alternative key operation is used, the alternative key operation giving an alternative processing equivalent to a processing required by the inputted key operation, and for executing the alternative key function if the user selects the alternative key function and the alternative key function is not inhibited by the inhibited operation information, wherein the control means displays the alternative operation message when any single key operation of the key operations which are inhibited on the inhibited operation information is repeatedly inputted to exceed a prescribed number of times without intervening any other key operation, the control means stores, in a key inputting buffer if the key operation is inputted, data corresponding to an inputted key operation, thereafter makes control of executing the processing corresponding to the data stored in the key inputting buffer, and stores, in the key inputting buffer if the user selects using the alternative key operation, data corresponding to the alternative key operation and thereafter makes control of executing the processing corresponding to the data stored in the key inputting buffer, the control means temporarily stops, if temporary stopping of movement of a screen is permitted when the alternative operation message is displayed, movement of the screen, and the control means displays, if there is no alternative key operation and when any single key operation of the key operations which are inhibited on the inhibited operation information is repeatedly inputted to exceed a prescribed number of times without intervening any other key operation, a message indicative of that the inputted key operation is inhibited in characters.

2. A video signal reproducing apparatus for playing a recording medium on which a video signal is recorded and inhibited operation information is recorded which is information representing whether or not an inputted key operation is inhibited, the video signal reproducing apparatus comprising:

a control means of displaying, if the inputted key operation is inhibited on the inhibited operation information, an alternative operation message causing a user to select whether or not an alternative key operation is used, the alternative key operation giving an alternative processing equivalent to a processing required by the inputted key operation, for executing the alternative key function if the user selects the alternative key function and the alternative key function is not inhibited by the inhibited operation information;

wherein the control means displays an alternative operation message when any single key operation of the key operations which are inhibited on the inhibited operation information is repeatedly inputted to exceed a prescribed number of times without intervening any other key operation.

3. A video signal reproducing apparatus for playing a recording medium on which a video signal is recorded and inhibited operation information is recorded which is information representing whether or not an inputted key operation is inhibited, the video signal reproducing apparatus comprising:
  a control means of displaying, if the inputted key operation is inhibited on the inhibited operation information, an alternative operation message causing a user to select whether or not an alternative key operation is used, the alternative key operation giving an alternative processing equivalent to a processing required by the inputted key operation, for executing the alternative key function if the user selects the alternative key function and the alternative key function is not inhibited by the inhibited operation information;
  wherein the control means stores, in a key inputting buffer if the key operation is inputted, data corresponding to an inputted key operation, and thereafter makes control of executing the processing corresponding to the data stored in the key inputting buffer, and stores, in the key inputting buffer if the user selects using the alternative key operation, data corresponding to the alternative key operation and thereafter makes control of executing the processing corresponding to the data stored in the key inputting buffer.

4. A video signal reproducing apparatus for playing a recording medium on which a video signal is recorded and inhibited operation information is recorded which is information representing whether or not an inputted key operation is inhibited, the video signal reproducing apparatus comprising:
  a control means of displaying, if the inputted key operation is inhibited on the inhibited operation information, an alternative operation message causing a user to select whether or not an alternative key operation is used, the alternative key operation giving an alternative processing equivalent to a processing required by the inputted key operation, for executing the alternative key function if the user selects the alternative key function and the alternative key function is not inhibited by the inhibited operation information;
  wherein the control means temporarily stops, if temporary stopping of movement of a screen is permitted when the alternative operation message is displayed, movement of the screen.

5. A video signal reproducing apparatus for playing a recording medium on which a video signal is recorded and inhibited operation information is recorded which is information representing whether or not an inputted key operation is inhibited, the video signal reproducing apparatus comprising:
  a control means for displaying, if the inputted key operation is inhibited on the inhibited operation information, an alternative key operating method which is a key operating method giving alternative processing which is processing equivalent to processing required by the inputted operation;
  wherein the control means displays, when any single key operation of the key operations which are inhibited on the inhibited operation information is repeatedly inputted to exceed a prescribed number of times without intervening any other key operation, an alternative key operating method using the key operation not inhibited on the inhibited operation information.

6. The video signal reproducing apparatus according to claim 5,
  wherein the control means temporarily stops, if temporary stopping of movement of a screen is permitted when the alternative key operating method is displayed, movement of the screen.

7. A video signal reproducing method for playing a DVD on which a video signal is recorded and inhibited operation information is recorded which is information representing whether or not an inputted key operation is inhibited, the method comprising:
  displaying, if the inputted key operation is inhibited on the inhibited operation information, an alternative operation message causing a user to select whether or not an alternative key operation is used, the alternative key operation giving an alternative processing coupled with a processing required by the inputted key operation;
  executing the alternative key function if the user selects the alternative key function and the alternative key function is not inhibited by the inhibited operation information;
  displaying the alternative operation message when any single key operation of the key operations which are inhibited on the inhibited operation information is repeatedly inputted to exceed a prescribed number of times without intervening any other key operation; storing, in a key inputting buffer if the key operation is inputted, data corresponding to an inputted key operation, thereafter making control of executing the processing corresponding to the data stored in the key inputting buffer;
  storing, in the key inputting buffer if the user selects using the alternative key operation, data corresponding to the alternative key operation, thereafter making control of executing the processing corresponding to the data stored in the key inputting buffer;
  temporarily stopping, if temporary stopping of movement of a screen is permitted when the alternative operation message is displayed, movement of the screen; and
  displaying, if there is no alternative key operation and when any single key operation of the key operations which are inhibited on the inhibited operation information is repeatedly inputted to exceed a prescribed number of times without intervening any other key operation, a message indicative of that the inputted key operation is inhibited in characters.

* * * * *